United States Patent [19]
Ogasawara et al.

[11] Patent Number: 5,327,740
[45] Date of Patent: Jul. 12, 1994

[54] DEHUMIDIFIER

[75] Inventors: Yoshinari Ogasawara, Gifu; Masumu Satoh, Kani; Kazuyoshi Hanazawa, Nagoya, all of Japan

[73] Assignee: CKD Corporation, Aichi, Japan

[21] Appl. No.: 973,771

[22] Filed: Nov. 9, 1992

[30] Foreign Application Priority Data

Nov. 18, 1991 [JP] Japan .................................. 3-302137

[51] Int. Cl.$^5$ ........................ F25D 17/06; F25D 21/00
[52] U.S. Cl. .......................................... 62/93; 62/272; 62/283; 62/285; 165/66
[58] Field of Search ................ 62/93, 272, 283, 285; 165/66, 156, 158; 55/267, 268, 269, DIG. 15, DIG. 17; 34/73, 75

[56] References Cited

U.S. PATENT DOCUMENTS

| | | | |
|---|---|---|---|
| 1,909,227 | 5/1933 | Shadle | 62/93 X |
| 2,790,507 | 4/1957 | Hankison | 62/93 X |
| 2,935,856 | 5/1960 | Gifford | 62/93 |
| 3,797,565 | 3/1974 | Fernandes | 62/93 X |
| 3,818,718 | 6/1974 | Freese | 62/93 X |
| 3,861,165 | 1/1975 | Hirano | 62/93 |
| 3,907,028 | 9/1975 | Lawson | 165/156 |
| 4,193,443 | 3/1980 | Nanaumi et al. | 165/66 |
| 4,235,081 | 11/1980 | Dowling | 62/93 |
| 4,428,205 | 1/1984 | Doderer | 62/93 |
| 4,497,182 | 2/1985 | Youngworth | 62/93 X |
| 4,638,852 | 1/1987 | Basseen et al. | 62/93 X |
| 4,646,819 | 3/1987 | Pridham | 62/93 X |

Primary Examiner—Henry A. Bennet
Assistant Examiner—C. Kilner
Attorney, Agent, or Firm—Heller, Ehrman, White & McAuliffe

[57] ABSTRACT

A dehumidifier includes an elongated body in which a first open ended chamber and a second open ended chamber are defined parallel to each other along the longitudinal direction of the body. A first cover and a second cover are detachably secured to the ends of the body, to cover the open ends of the first and second chambers, respectively. An evaporator is housed in the first chamber. A pipe is disposed in the second chamber, and divides the second chamber into a precooling zone, which corresponds to the internal space of the pipe extending along the axis thereof, and a reheating zone which corresponds to the external space. A path connects the outlet of the precooling zone and the inlet of the first chamber, and is defined between the dehumidifier body and the second cover, for feeding the air from the precooling zone to the first chamber. Another path connects the outlet of the first chamber and the inlet of the reheating zone, and is defined between the body and the first cover, for leading the air from the first chamber to the reheating zone. The body, covers, evaporator and pipe are made of rust proof material.

9 Claims, 5 Drawing Sheets

DEHUMIDIFIER

BACKGROUND OF THE INVENTION

1. Field of the Invention

The present invention relates to a dehumidifier for removing the moisture in the air by heat exchange.

2. Description of the Related Art

Such type of a prior art dehumidifier is disclosed in Japanese Utility Model Publication No. 57-59820, in which a cooling zone is defined by an inner housing and an evaporator accommodated therein. A precooling zone is defined between the inner housing and a cylindrical outer housing in which a heat transfer pipe is accommodated. Both end openings of the outer housing are sealed by covers welded thereto.

Hot end moist air passes through the precooling zone, and thereafter through to the cooling zone. The air passing through the cooling zone is allowed to escape to the outside through the heat transfer pipe. The moisture in the air is removed when it is cooled in the cooling zone, and the dehumidified cool air flows through the heat transfer pipe. Accordingly, the hot and moist air flowing in the precooling zone can be precooled by the cool air in the heat transfer pipe.

The foregoing conventional dehumidifier consists mainly of iron members, and rust is caused by the hot and moist air passing through the dehumidifier. Accordingly, the wall thickness of the dehumidifier must be increased in order to take the rust effect into consideration. This will increase the size and weight of the dehumidifier. There is also a possibility that rust will contaminate the dry air to be discharged.

Both end openings of the outer housing are sealed by the covers which are welded thereto. However, the welding of the covers requires professional staffing, and also the welded products do not usually maintain their initial quality and reliability. Besides, most of the parts inside the outer housing are fixed by welding, so that intricate, laborious and time-consuming welding operations are required to produce the dehumidifier. Further, since the covers are directly welded to the outer housing, the apparatus cannot be easily disassembled to maintain the various components of the dehumidifier.

If the quantity of heat in the incoming hot and moist air is above the heat exchange capacity of the dehumidifier, an additional unit for assisting in cooling the dehumidifier will be required.

SUMMARY OF THE INVENTION

The present invention addresses and resolves the foregoing problems with conventional dehumidifiers. It is a first object of the invention to provide a rust proof, light and compact dehumidifier.

It is a second object of the invention to provide a dehumidifier which can be manufactured and assembled without welding, and which has the capacity to process significant heat transfer.

In order to attain the above objects, the dehumidifier according to the present invention includes a first chamber and a second chamber formed parallel to each other, along the longitudinal direction of the dehumidifier body.

A first cover and a second cover are detachably secured to the ends of the body, to seal the open ends of the first and second chambers, respectively. An evaporator is accommodated in the first chamber. A pipe extends through the second chamber, and divides it into a precooling zone and a reheating zone. The precooling zone corresponds to the internal space of the pipe. The reheating zone corresponds to the space outside the pipe and inside the second chamber. A path connects the outlet of the precooling zone to the inlet of the first chamber, and is defined between the dehumidifier body and the second cover, for feeding the air to the first chamber. A path connects the outlet of the first chamber to the inlet of the reheating zone, and is defined between the body and the first cover, for feeding the air to the reheating zone. The body, covers, evaporator and pipe are made of rust proof material.

BRIEF DESCRIPTION OF THE DRAWINGS

The features of this invention that are believed to be novel are set forth with particularity in the appended claims. The invention, together with the objects and advantages thereof, may best be understood by reference to the following description of the presently preferred embodiments, taken in conjunction with the accompanying drawings, in which:

DETAILED DESCRIPTION OF THE PREFERRED EMBODIMENTS

Figure 1:
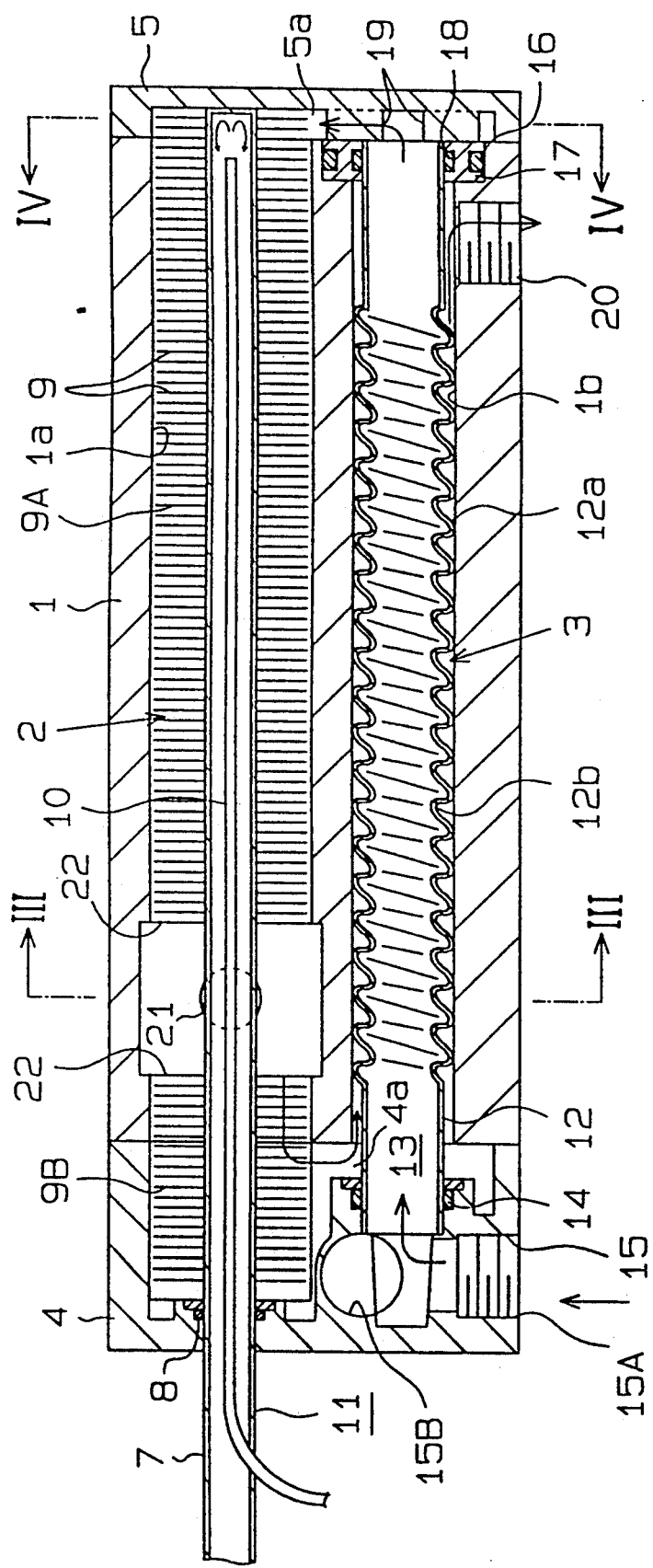
FIG. 1 shows a horizontal cross-sectional view of a dehumidifier according to a first embodiment of the invention.
Figure 2:
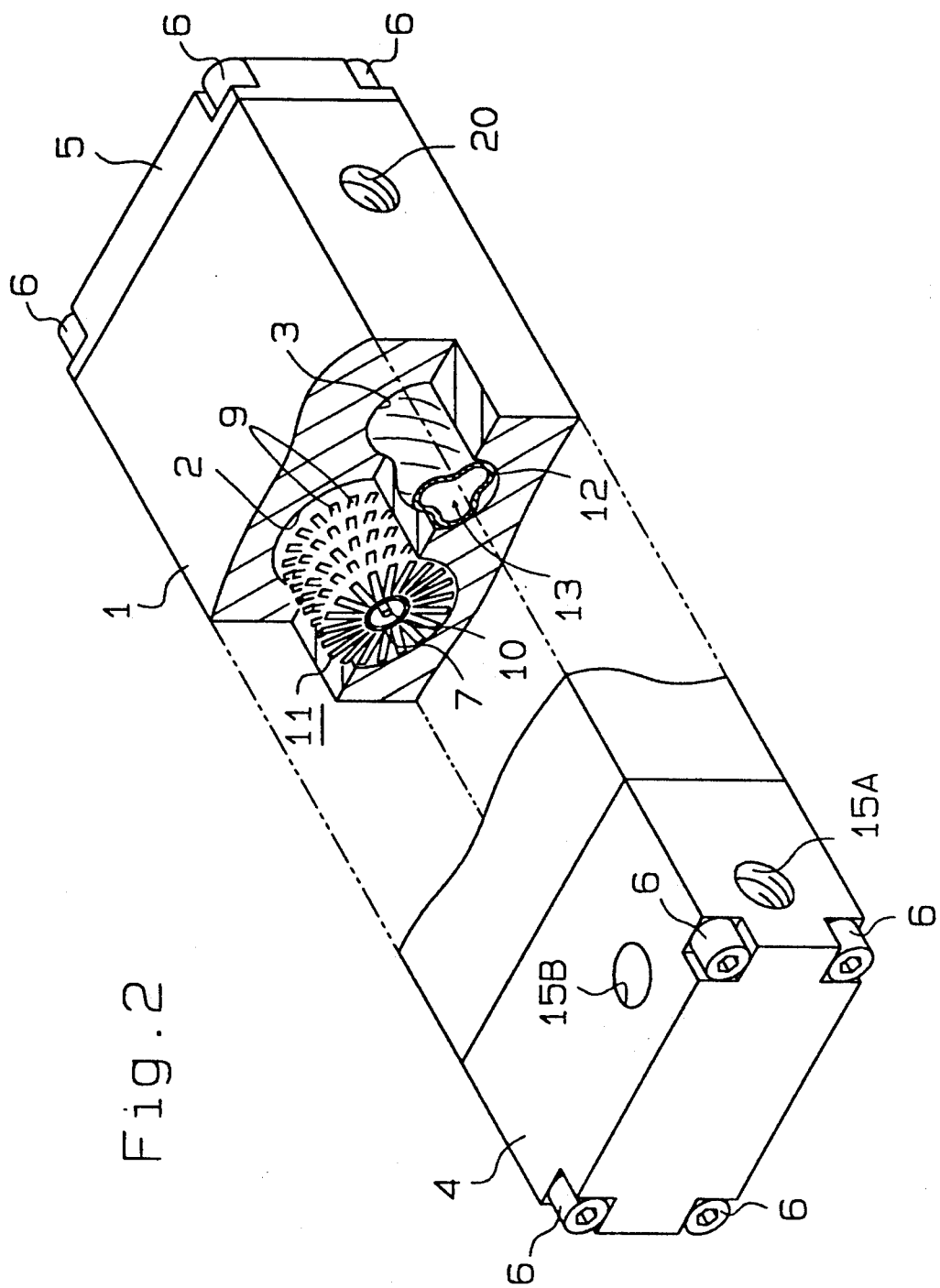
FIG. 2 shows a partially cutaway perspective view of the dehumidifier shown in FIG. 1.

A first embodiment of the invention will now be described referring to the attached drawings.

As shown in FIGS. 1 to 4, the dehumidifier includes a body 1 which is made of rust proof material, such as aluminum, and has a substantially rectangular cross section. Two elongated bores or openings 1a and 1b, each of which has a circular cross section, are defined in the body 1, in parallel relationship to each other, and extend along the longitudinal axis of the body 1. The first bore 1a constitutes a cooling chamber 2, and the second bore 1b constitutes a part of a reheating chamber 3. Aluminum covers 4 and 5 are detachably fitted to both ends of the body 1 by means of a plurality of hexagonal socket head cap screws. The covers 4 and 5 seal the end openings of the first and second bores 1a and 1b, respectively.

A copper or aluminum refrigerant pipe 7 is inserted in the cooling chamber 2 and penetrates through the cover 4. The free end of the refrigerant pipe 7 is closed and abuts the inner surface of the other cover 5. A seal ring 8 is interposed between the cover 4 and the refrigerant pipe 7 to secure hermetic sealing of the cooling chamber 2. A plurality of closely spaced apart elongated aluminum heat exchange fins 9 extend radially from the outer periphery of the refrigerant pipe 7 to form a high density heat exchange device. A capillary tube 10 is inserted inside the pipe 7, for feeding a refrigerant thereto, in such a way that a free open end of the tube 10 is located adjacent to the closed free end of the refrigerant pipe 7. The refrigerant is supplied from one open end of the capillary tube 10 into the refrigerant pipe 7. The refrigerant pipe 7, heat exchange fins 9 and capillary tube 10 constitute an evaporator 11.

A heat transfer pipe 12 is inserted in the second bore 1b, such that the internal space of the heat transfer pipe 12 constitutes a precooling chamber 13. A middle portion of the heat transfer pipe 12 is spirally waved, with the spiral crests 12a contacting the inner wall surface of the second bore 1b. A plurality of spiral spaces forming the reheating chamber 3, are defined between a spiral troughs 12b of the heat transfer pipe 12 and the inner wall surface of the second bore 1b.

An inlet side end portion (left end portion in FIG. 1) of the heat transfer pipe 12 is fitted into the cover 4 with a seal ring 14 interposed therebetween. Inlets for the heat transfer pipe 12, i.e. air inlets 15 and 15B, communicating with the inlet of the precooling chamber 13, are defined in the cover 4 at one side wall as well as at the top and bottom, respectively. Hermetical sealing between the air inlet side and the reheating chamber side is achieved by the seal ring 14. The air inlets 15B opening to the top and bottom of the cover 4 are normally plugged, and only the air inlet 15A opening to the side wall is normally unplugged. The outlet (the left end opening in FIG. 1) of the cooling chamber 2 and the inlet (the left end opening in FIG. 1) of the reheating chamber 3 are connected by a path 4a defined between the cover 4 and the body 1.

Figure 4:
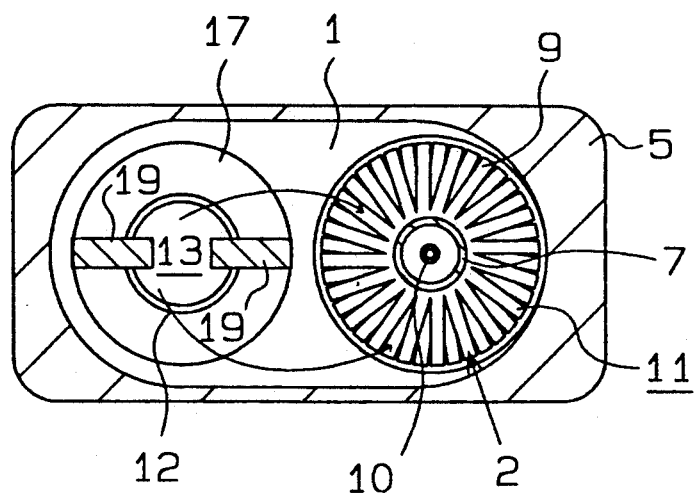
FIG. 4 is a cross-sectional view of the dehumidifier taken along the line IV—IV of FIG. 1.

As shown in FIGS. 1 and 4, an annular spacer 17 is fitted around the inner circumference on the outlet side (the right end opening in FIG. 1) of the reheating chamber 3 with a seal ring 16 being interposed therebetween. The outlet side (right end opening in FIG. 1) of the heat transfer pipe 12 is fitted into the spacer 17 via a seal ring 18. A pair of steps 19 is formed on the inner surface of the cover 5, adjacent to the spacer 17 and the heat transfer pipe 12. The steps 19 partially abut the spacer 17 and the heat transfer pipe 12. The outlet of the heat transfer pipe 12, i.e. the outlet of the precooling chamber 13, and the inlet (the right end opening in FIG. 1) of the cooling chamber 2 are connected by a path 5a which is defined between the cover 5 and the body 1. An air outlet 20 is defined in one side wall of the body 1 and communicates with the outlet of the reheating chamber 3. Hermetical sealing between the air outlet side and the outlet side of the precooling chamber 13 is achieved by the seal rings 16 and 18.

Figure 3:
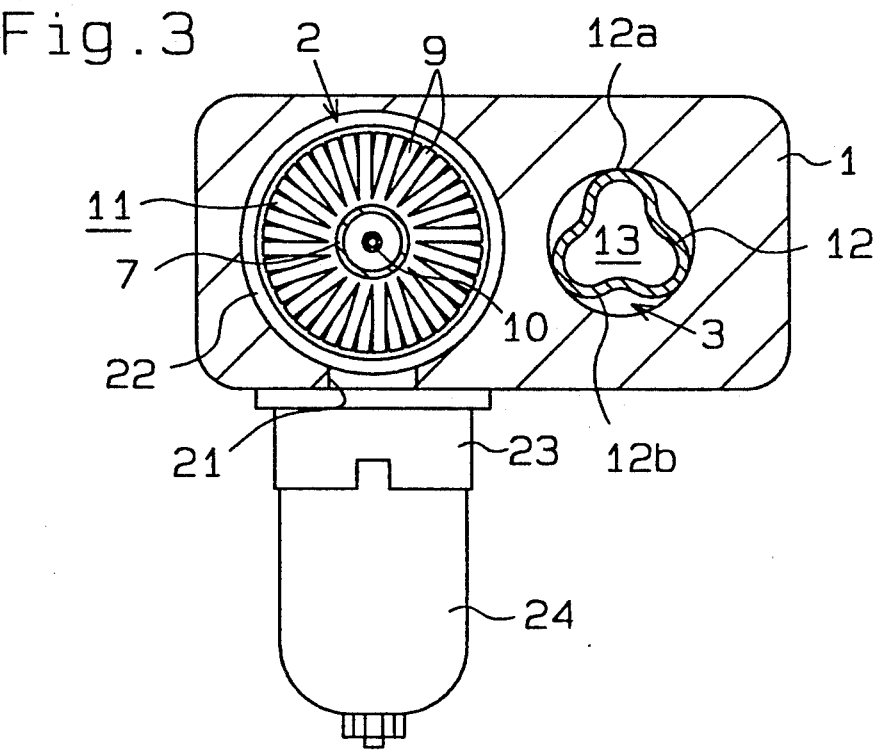
FIG. 3 is a cross sectional view of the dehumidifier taken along the line III—III of FIG. 1.

As shown in FIGS. 1 and 3, a discharge port 21 communicates with the outlet side of the cooling chamber 2, and is defined at the bottom of the body 1. The evaporator 11 does not include heat exchange fins 9 in an intermediate section that is adjacent to the location of the discharge port 21. Accordingly, the heat exchange fins 9 are divided into two groups on each side of the discharge port 21, i.e. a first fin group 9A on the inlet side and a second fin group 9B on the outlet side of the cooling chamber 2. Steps 22 are formed on the inner wall surface of the cooling chamber 2 at the location of the discharge port 21 so that the cross-sectional area of the cooling chamber 2 is enlarged compared with the other sections. As shown in FIG. 3, a drain trap 24 is connected to the discharge port 21 via a cap 23. The operation of the dehumidifier will now be described in detail.

Hot and humid air is introduced through the air inlet 15A to the precooling chamber 13 defined in the heat transfer pipe 12 and flows rightward (FIG. 1). The air passes through the precooling chamber 13 and is led to the cooling chamber 2 through the space between the steps 19 and the path 5a and then flows leftward between the heat exchange fins 9 (FIG. 1). The air in the cooling chamber 2 is cooled by the evaporator 11, and the moisture in the air is simultaneously removed by the evaporator 11. Accordingly, the hot and humid air is converted into cool and dry air after passing through the cooling chamber 2. The moisture which is removed from the air is discharged through the discharge port 21 and the drain trap 24.

As described above, the moisture in the air flowing through the cooling chamber 2 is removed mostly by the heat exchange action with the first fin group 9A. Since the cross-sectional area of the cooling chamber 2 is enlarged at the intermediate section between the first and second fin groups 9A and 9B, the air flow rate is reduced at this intermediate section. Accordingly, the moisture removed from the air is prevented from being carried by the air flow beyond the discharge port 21 into the reheating chamber 3. The moisture is substantially retained in the intermediate section.

The step 22 serves to make certain that the moisture will be guided through the discharge port 21 to the drain trap 24, without flowing along the inner bottom surface of the cooling chamber and going into the reheating chamber 3. Dust and other impurities remaining in the air after passing through the first fin group 9A are removed by the second fin group 9B.

The cool and dry air, having passed through the cooling chamber 2, is led to the reheating chamber 3 through the path 4a. After flowing spirally along the outer periphery of the heat transfer pipe 12 toward the air outlet 20, the air is discharged from the air outlet 20. Thus, the hot and humid air in the precooling chamber 13 is first precooled by the cool and dry air flowing around the precooling chamber 13 before entering the cooling chamber 2, and the load on the evaporator 11 can be reduced. The cool and dry air passing through the reheating chamber 3 is heated by the hot and humid air introduced to the precooling chamber 13.

In the dehumidifier according to the first embodiment, as described above, the heat transfer pipe 12 has a spirally waved portion. Thus, not only the surface area on the outer circumference of the pipe but also the distance of the path for the cool and dry air can be made greater than in a dehumidifier with a smooth cylindrical pipe having no spirally waved portion. Further, the waved inner wall surface of the heat transfer pipe 12 causes turbulence in the flow of the hot and humid air in the pipe 12. Accordingly, the heat exchange effectiveness in the precooling chamber 13 can be improved to provide a better precooling effect than if the cool and dry air flow and the hot and humid air flow are laminar.

Since the entire apparatus is made of rust proof materials such as aluminum according to the first embodiment of the invention, there is no danger of rusting, and hence the wall thickness need not be made large. This contributes to the reduction in the size and weight of the apparatus. Further, clean air can be processed without rust contamination.

Since the covers 4 and 5 are secured to the body 1 by hexagonal socket head cap screws 6, furthermore, they can be removed easily, allowing easy maintenance of the internal portion of the apparatus. The fitting by the screws 6 does not require skilled labor and, consequently, the products can maintain a substantially fixed high quality of operation and reliability.

According to the first embodiment of the invention, since the body 1 has a cylindrical shape having two bores, the body can be molded by extrusion, and thus the length of the body can easily be changed. Accordingly, when very hot air is to be processed, the heat exchange capacity of the apparatus can be increased merely by elongating the body 1, the cooling chamber 2, the reheating chamber 3 and the other components. In other words, the degree of freedom in the design is high. In this case, the length of the evaporator 11 and that of the heat transfer pipe 12 must be changed depending on the length of the body 1. Since, the evaporator 11 includes a plurality of heat exchange fins 9 that are radially formed on the outer periphery circumference of a linear refrigerant pipe 7, and the heat transfer pipe 12 is linear, the length of these components can be easily changed. Covers 4 and 5 of the same size can be used irrespective of the length of the body 1.

As described above, since both the evaporator 11 and the heat transfer pipe 12 are basically comprised of a linear pipe, their structure is relatively simple and provides high efficiency of space utilization, so that the size of the entire apparatus can be reduced. Besides, the evaporator 11 provides sufficient heat exchange capacity by means of the heat exchange fins 9. The spirally waved portion in the heat transfer pipe 12 also provides sufficient heat exchange capacity. A refrigerant is supplied from the capillary tube 10 and discharged from the refrigerant pipe 7, and the inlet and outlet of the refrigerant are provided on the same side so that supply and discharge of the refrigerant to and from the evaporator 11 can be facilitated.

The evaporator 11 and the heat transfer pipe 12 are not fixed to the body 1. In other words, the evaporator 11 is inserted to the cooling chamber 2 of the body 1 and is designed to pass through the cover 4 so as to be supported partially thereby. The heat transfer pipe 12 is fitted at the inlet side into the cover 4 so as to be supported thereby. The outlet side of the pipe 12 is inserted through the spacer 17 so as to be supported thereby. Accordingly, the evaporator 11 and the heat transfer pipe 12 can easily be detached from the body 1 when the covers 4 and 5 are removed. This makes it easy to assemble, replace and maintain the dehumidifier. Moreover, the seal rings 8, 14, 16 and 18 are disposed respectively at the supporting portions of the evaporator 11 and heat transfer pipe 12 can secure airtightness of the apparatus.

In this embodiment, the drain trap 24 is directly attached to the body 1 with no discharge pipe or the like being interposed therebetween, so that the entire apparatus can be made compact and that there is no fear of having such discharge piper clogged with dust or other impurities.

Figure 5:
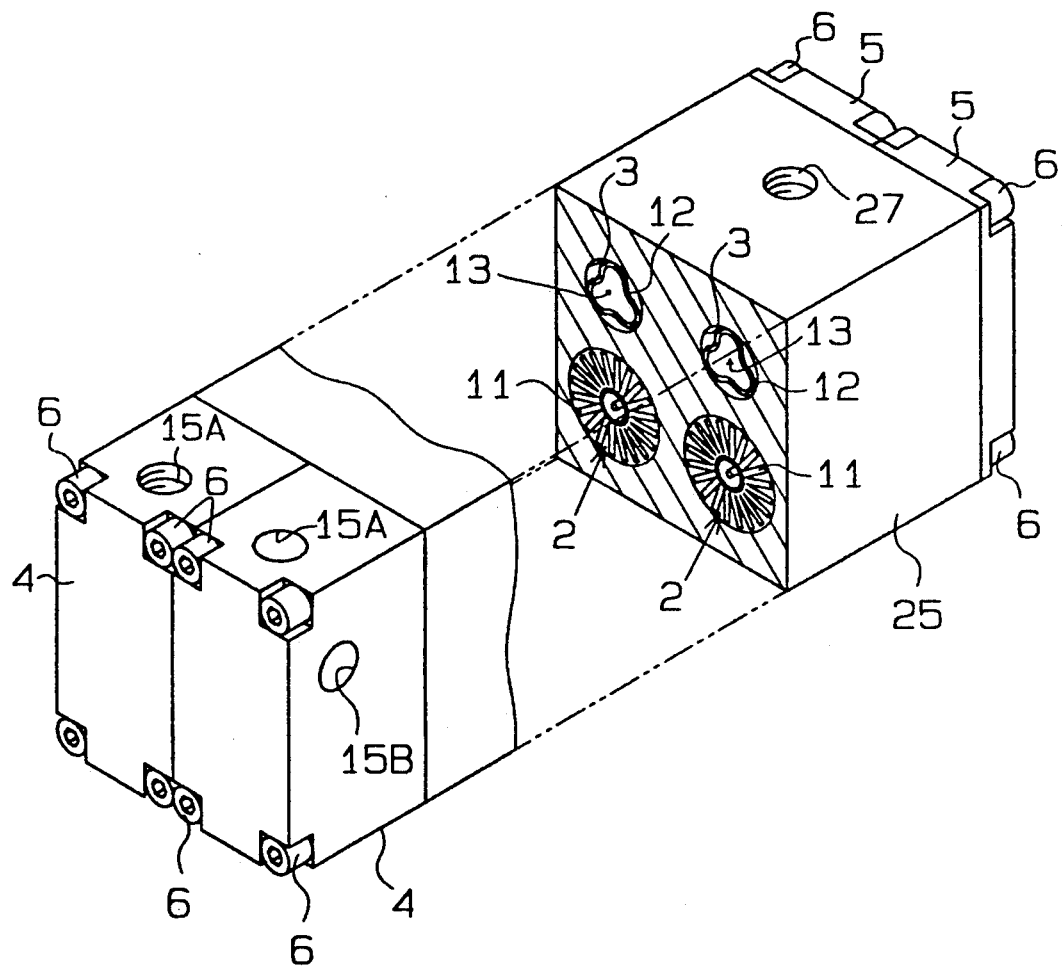
FIG. 5 shows a partially cutaway perspective view of a dehumidifier according to a second embodiment of the invention.
Figure 6:
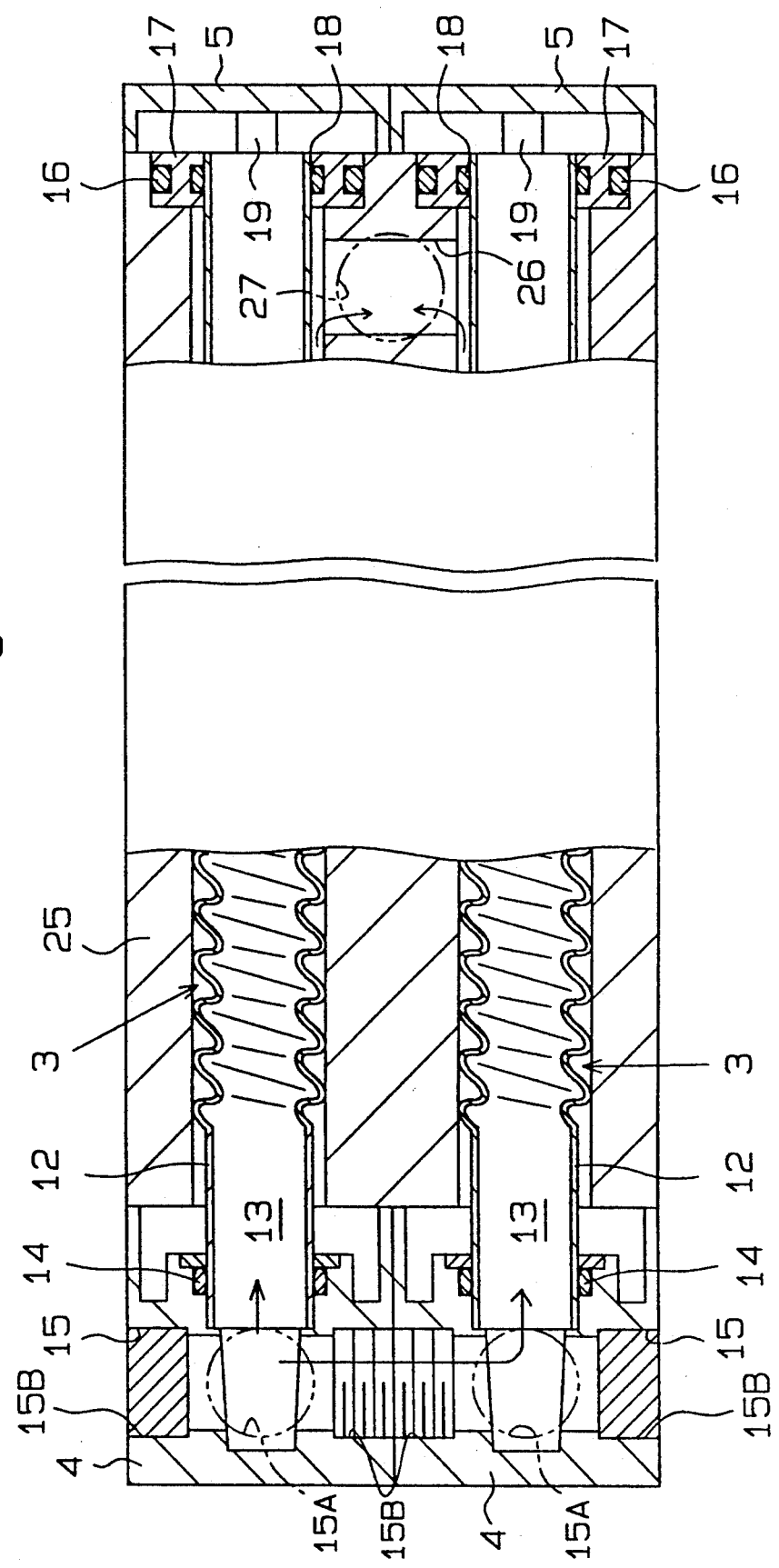
FIG. 6 is a horizontal cross sectional view of the dehumidifier shown in FIG. 5.

FIGS. 5 and 6 show another dehumidifier according to a second embodiment of the invention. As shown in FIGS. 5 and 6, two cooling chambers 2 and two reheating chambers 3 may be defined in a body 25, in parallel, with two evaporators 11 and two heat transfer pipes 12 disposed therein. This embodiment employs two sets of the heat exchanger used in the first embodiment.

In this second embodiment, two each of covers 4 and 5, similar to those used in the first embodiment, are secured to each end of the body 25. One of the air inlets 15B is defined in the top and bottom (in the second embodiment the top and bottom turn to side walls) of each cover 4 (which is plugged in the first embodiment) is opened, and the unplugged air inlets 15B of the respective covers 4 are aligned to allow communication therebetween. Further, the air inlet 15A of one cover 4 is opened and that of the other cover 4 is plugged. Hot and humid air introduced from the unplugged air inlet 15A is led to the two precooling chambers 13 through the air inlet 15B.

A throughhole 26 is formed on the outlet side of the two reheating chambers 3 defined in the body 25, and an air outlet 27 communicating with the throughhole 26 is also designed to open to the top surface of the body 25. The air which dehumidified in these two chambers separately is combined at the outlet side of the reheating chambers 3, passes through the throughhole 26, and is discharged from the single air outlet 27.

Accordingly, by preparing a different body 25 of double structure, the dehumidifier can cope with twofold throughput of air, employing similar parts as those used in the first embodiment.

Although two embodiments of the present invention have been described herein, it should be apparent to those skilled in the art that the present invention may be embodied in many other different forms without departing from the spirit of scope of the invention. For example, it would be possible to use a body 1 or 25 and covers 4 and 5 that are made of synthetic resin materials.

What is claimed is:

1. A dehumidifier, comprising:

a generally elongated body having a first end and a second end;

a first open ended chamber and a second open ended chamber disposed in parallel to each other along the longitudinal direction of said body, said first and second chambers each having an air inlet and an air outlet;

a first cover and a second cover detachably fitted to said first and second ends of said body, respectively, for covering the open ends of said first and second chambers;

an evaporator disposed in said first chamber;

a pipe disposed in said second chamber and having an internal space and an external space, said pipe dividing said second chamber into a precooling zone corresponding to the internal space of said pipe, and a reheating zone corresponding to the external space of said pipe, said precooling zone and said reheating zone each having an air inlet and an air outlet;

a first path connecting said outlet of said precooling zone with said inlet of said first chamber, said first path being defined between said body and said second cover for introducing the air fed to said precooling zone to said first chamber; and a second path connecting said outlet of said first chamber with said inlet of said reheating zone, said second path being defined between said body and said first cover for leading the air introduced to said first chamber to said reheating zone;

said body, said covers, said evaporator and said pipe being made of rust proof material; said first chamber having a discharge port for discharging moisture removed from the air by said evaporator; said evaporator including a refrigerant pipe and a plurality of heat exchange fins extending radially outward from the outer periphery of said pipe; and said refrigerant pipe including an intermediate section which does not have heat exchange fins at and near the location of said discharge port.

2. The dehumidifier according to claim 1, wherein an air inlet communicating with said precooling zone for introducing air to said precooling zone is formed in said first cover; and an air outlet communicating with said reheating zone for discharging the air from said reheating zone is defined in said body.

3. The dehumidifier according to claim 1, wherein said evaporator and said pipe are detachably disposed in said first and second chambers respectively.

4. The dehumidifier according to claim 1, wherein said intermediate section has a larger cross-sectional area than in other fin carrying sections of said pipe.

5. The dehumidifier according to claim 1, wherein said pipe has a spirally waved portion, and said reheating zone is defined between said waved outer periphery of said pipe and the inner wall surface of said second chamber.

6. The dehumidifier according to claim 1, wherein the free end of said refrigerant pipe abuts against the inner wall surface of said second cover, and the other end thereof penetrates through said first cover and extends outwardly.

7. The dehumidifier according to claim 1, wherein a spacer is disposed between said pipe and said second chamber on the outlet side of said precooling zone, to support one end of said pipe thereby, whereas the other end of said pipe is supported by said first cover.

8. The dehumidifier according to claim 7, wherein seal rings are disposed between said spacer and said pipe, between said spacer and the internal wall surface of said second chamber, and between said pipe and said first cover.

9. The dehumidifier according to claim 1 further comprising a drain trap directly connected to said discharge port.

* * * * *